Jan. 29, 1963

H. E. FREY 3,075,863

FLEXIBLE LAMINATES OF POLYVINYL CHLORIDE
AND METHOD OF MAKING SAME

Filed Dec. 12, 1958

INVENTOR
Horst Ernst Frey

BY McCoy, Greene + deGrotenhuis
ATTORNEYS

United States Patent Office 3,075,863
Patented Jan. 29, 1963

3,075,863
FLEXIBLE LAMINATES OF POLYVINYL CHLORIDE AND METHOD OF MAKING SAME
Horst Ernst Frey, Chicago, Ill., assignor to The General Tire & Rubber Company, Akron, Ohio, a corporation of Ohio
Filed Dec. 12, 1958, Ser. No. 779,923
4 Claims. (Cl. 154—46)

This invention relates to the preparation of flexible laminates of polyvinylchloride film with rubber or fabric bases and method of preparing the same. It more particularly relates to the preparation of flexible sheet material from polyvinyl chloride compositions which are backed with a fabric or rubber base and which are useful as upholstery materals, floor mats, and the like.

Polyvinyl chloride films have found wide commercial uses due to their inertness, cleanability, and attractive appearance, and their value due to their appearance is further enhanced by their coloring possibilities. However, the polyvinyl chloride must be plasticized to make it pliable and flexible, and laminates of polyvinyl chloride have suffered from the serious drawback of plasticizer loss such as by volatilization and by migration into the backing material, which migration is particularly harmful when the backing is rubber. The loss of plasticizer leaves polyvinyl chloride film less flexible. When the plastic polyvinyl chloride laminates are used as upholstery covering for automobile seats, lacquer finishes used on various surfaces of the automobile interior may also be marred by loss of plasticizer.

One object of the present invention is to provide a plasticized polyvinyl chloride laminate which does not become sticky and brittle upon aging.

Another object of the present invention is to provide a method of making polyvinyl chloride laminates so that the plasticized polyvinyl chloride layer can be used next to lacquer finishes without marring the same.

These and other objects will be apparent from the specification, claims and appended drawing in which:

The present invention provides a method of making laminates utilizing flexible plasticized polyvinyl chloride layers with fabric and rubber base layers in which the polyvinyl chloride layers retain their original color, flexibility and surface without the harm caused by the loss of plasticizer.

The invention is particularly directed to making an inexpensive yet durable rubber base floor mat having an outer topcoating of an attractive flexible polyvinyl chloride layer composition which does not become brittle upon aging.

Figure 1:
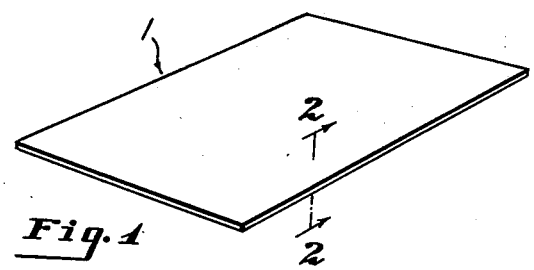
FIGURE 1 is a perspective view of a floor mat made in accordance with the present invention.
Figure 2:
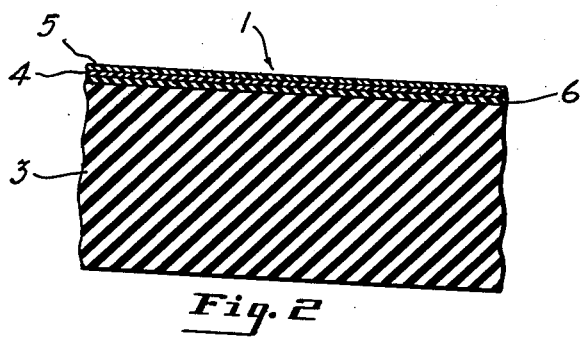
FIG. 2 is an elevated sectional view taken along lines indicated in 2—2 in FIG. 1.

Referring more particularly to the drawing, FIGS. 1 and 2 show a rubber floor mat comprising a rubber base layer 3 and a central barrier layer 4 of polymethyl methacrylate interposed between the base layer 3 and an upper layer 5 of a plasticized polyvinyl chloride composition. I have found that a polymethyl methacrylate barrier layer 4 not only improves the bond of the polyvinyl chloride layer 5 and rubber base 3 together with adhesive layer 6 but it also effectively prevents migration of monomer plasticizer from the polyvinyl chloride layer into the rubber base, which may be solid rubber or a foamed rubber. The resultant article then retains all the advantages of a plasticized polyvinyl chloride covering material without the usual brittleness found in the polyvinyl chloride layer upon aging. Also, the resultant article does not suffer from deterioration of the rubber layer from migration of the polyvinyl chloride plasticizer into the rubber layer.

It has been proposed, as seen in U.S. Patent No. 2,430,934, to make a floor covering by covering a felt base backing material with a relatively hard rigid sheet of polyvinyl chloride composition. The polyvinyl chloride and felt base were bonded together by a layer of methacrylate resin next to the polyvinyl chloride layer and a layer of an adhesive such as hydrogenated rosin next to the felt base. The methacrylate layer was never used alone but always in conjunction with a varnish type resin to obtain proper adhesion. Thus the problem faced by the patentee in making the floor covering was to provide adhesion between a relatively unplasticized polyvinyl chloride layer and a resinous coated base material. This problem was entirely different than the problem of not only bonding a highly plasticized polyvinyl chloride layer to a rubber or fabric base, but also at the same time preventing plasticizer migration from the polyvinyl chloride layer to the rubber and migration of staining ingredients from the rubber to the film of polyvinyl chloride. As noted in the above U.S. patent, the amount of plasticizer and fillers in the polyvinyl chloride layer used by the patentees was kept to a minimum since they greatly decreased the wearing properties of the tile, and thus there is no suggestion as to how to combat the plasticizer migration.

It is further noted that a rubber base article such as an automobile floor mat presents an additional problem of migration of rubber compounding ingredients into the polyvinyl chloride layer which is not present when the base materials are oleo-resinous compounds and felt materials.

According to the present invention, the barrier layer 4 is preferably formed from a solution of polymethylmethacrylate, generally a solution of about 5 to 25% of the resin, in a suitable organic solvent such as a mixture of methyl ethyl ketone and toluene which is preferred although solutions of higher concentrations when spreadable, i.e., up to 40% or so, or as little as 3 or 4% may be used. More than one coat is desirable when the resin content is very low such as 3 or 4%. The polymethyl-methacrylate solution may be coated on the back of the vinyl film by known methods such as engraved roller coating or spreading with a doctor knife. Methyl methacrylate provides the best adhesion and plasticizer barrier between the top and base layers, but part of the above resin may be substituted for by an ester of an alpha-beta unsaturated organic acid including alpha alkyl and halo substituted alpha-beta substituted carboxyl acids having less than 6 aliphatic carbon atoms including esters of acrylic acid and methacrylic acid such as polymethylacrylate, polyethylacrylate, poly n-butyl acrylate, poly chloroacrylate, and polyethyl methacrylate. However, it is preferred that any mixture of polymethacrylic or polyacrylic acid esters contain at least 50% by weight of polymethyl methacrylate for the best combination of barrier and adhesive properties.

The barrier layer 4 itself is generally much thinner than the PVC top layer or rubber base layer, being preferably about ¼ to 1 mil in thickness.

Other compounding ingredients, such as plasticizers and fillers, which are well known in the art may be used in the polyvinyl base compositions. Other suitable additives are heat and light stabilizers, flame retardants, bodying agents, colors and volatile solvents.

The following example illustrates the polyvinyl chloride composition:

Example 1

| Ingredients | Parts by Weight | |
| --- | --- | --- |
| | A | B |
| Polyvinylchloride | 100 | 100 |
| Dioctyl phthalate | 20 | 25 |
| Dioctyl adipate | 10 | |
| Paraplex G-62 (an epoxidized medium molecular weight polyester plasticizer sold by Rohm and Haas) | 10 | 10 |
| Paraplex G-53 (a high molecular weight polyester plasticizer) | | 10 |
| Barium-cadmium stabilizer | 2 | 2 |
| Filler (calcium carbonate) | 13 | 13 |

The ingredients are mixed together by mastication at elevated temperatures of about 350 or 375° F., according to usual practice, and calendered to a film of about 5 to 30 mils (generally 20 mils thickness). The polyvinyl chloride resin of the above example may be substituted by copolymers of vinyl chloride and vinyl acetate having 85–99% combined vinyl chloride, poly vinylidene chloride and copolymers of vinylidene chloride and vinyl chloride etc.

The polyvinyl chloride layer 5 is preferably about 5–15 mils in thickness, while that of a suitable rubber base layer is generally from about 50 mils up to 1–4" or more.

The polyvinyl chloride film is then coated in accordance with the present invention with a solution such as hereinafter described of polymethyl methacrylate in methyl ethyl ketone and toluene, or in any other volatile organic solvent for polymethyl methacrylate. The solution is preferably engraved roller-coated on the polyvinyl chloride film but said film may also be applied by spraying or spreading, as is well known. After drying of the barrier layer on the polyvinyl chloride, there is superimposed directly on top of the barrier layer an adhesive suitable for adhering rubber and polyvinyl chloride to form the layer 6 illustrated in FIG. 2.

I have found that mixtures of a nitrile rubber and styrene-butadiene rubber are excellent adhesives, particularly when applied to a polymethyl methacrylate barrier as aforesaid. The adhesives are preferably applied as a mixed aqueous dispersion. Thus, excellent adhesion is found with a latex mixture prepared by mixing equal parts of a latex of styrene and butadiene having more than 50 parts of styrene, and preferably 60 to 90 parts of styrene, with a latex (aqueous dispersion) of a copolymer of a diolefin compound, such as butadiene, isoprene or chloroprene and the like with an acrylonitrile, preferably having about equal parts of the diolefinic compound and acrylonitrile in said copolymer.

To illustrate the formation of the vinyl coated rubber base, the composite polyvinyl chloride sheet, i.e., polyvinyl chloride film or sheet, coated with a solution of methyl methacrylate to form on one back of the polyvinyl chloride sheet a dry film of one-half mil thickness or thereabouts, is coated with a mixed aqueous dispersion having about 30% rubber solids content, comprising about equal parts of (1) a copolymer of 50 parts of butadiene and 50 parts of acrylonitrile with (2) a copolymer of about 65 to 70 parts of styrene and about 35 or 30 parts of butadiene, to form an adhesive layer thereon. The composite polyvinyl chloride sheet having the dried adhesive thereon is then applied over a layer or sheet of prevulcanized or unvulcanized solid or sponge rubber compound. To firmly anchor the parts together the assembly is thereupon placed between platens or in a mold, heated to about 300° F., to cause adherence of the coated polyvinyl chloride onto the rubber backing. Also, a continuous process can be used where the layers are combined and led through an oven or over a heated drum under pressure. At the same time the surface of the vinyl sheet can be embossed. A strongly bonded rubber-plastic laminate results.

The rubber base 3, preferably in sheet or slab form, may be any vulcanized or unvulcanized solid resilient rubber composition compounded as is well known in the art or any vulcanized sponge rubber composition. It is preferably compounded with so-called "non-staining" antioxidants. The rubber thereof may be natural rubber, synthetic rubber, including any one or more sulfur vulcanizable synthetic rubbers such as a butadiene-styrene copolymer, butadiene-acrylonitrile copolymers or other suitable resilient rubbery material.

The butadiene-acrylonitrile copolymer used in the above adhesive may be varied by increasing or decreasing the proportion of acrylonitrile, or by substituting other conjugated diolefinic compounds such as isoprene and chloroprene for all or part of the butadiene used. Generally, the acrylonitrile or methacrylonitrile content may be varied from 60 to 25% of the weight of the copolymer. The styrene copolymer in the above adhesive composition may be varied very substantially. All or part of the butadiene may be substituted by the other diolefinic compounds named etc. The styrene may be substituted in whole or in part by any copolymerizable styrene including alpha methyl styrene, and vinyl toluene. As low as 25% of a styrene in the copolymer may be used to obtain a fair degree of adhesion. However, superior adhesion is obtained when the amount of the styrene component is more than 50% of the copolymer and up to 90% may be used.

Figure 3:
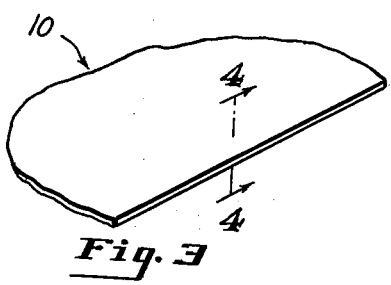
FIG. 3 is a fragmentary perspective view of a backed polyvinyl chloride sheeting in accordance with the present invention.
Figure 4:
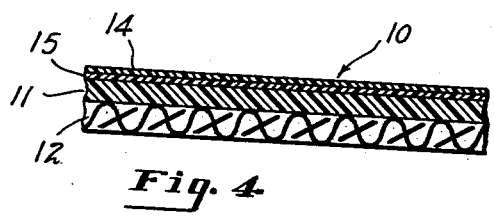
FIG. 4 is an elevational sectional view taken along lines 4—4 indicated in FIG. 3.

It, also, has been found that a barrier layer of polymethyl methacrylate prevents plasticizer loss in flexible polyvinyl chloride backed sheeting. The barrier layer prevents interaction of a migrating plasticizer with other material such as in case of an automobile seat cover made of polyvinyl chloride sheeting in direct contact with a metal surface having a lacquer finish based on nitrocellulose. While the barrier layer of polymethyl methylacrylate over the polyvinyl chloride layer prevents plasticizer loss apparently from volatility or by extraction by soapy water, oil or the rubbing action of dust that the vinyl layer may be exposed to, such an exposed layer has a tendency to produce microscopic folds, creases and cracks upon flexing. I have found, however, that by superimposing a film deposited from a solution of polymethyl methacrylate having polyvinyl chloride dispersed therein this sensitivity to flexing may be eliminated. This latter feature is also applicable to topcoating of polyvinyl chloride films whether on rubber or on fabric backing or even unbacked polyvinyl chloride. This embodiment for eliminating the phenomenon of crazing of a polymethyl methacrylate surface coating is illustrated by FIGS. 3 and 4 on a fabric backed polyvinyl chloride or used for an upholstery fabric. As thus shown the polyvinyl chloride backed sheeting 10 comprises a flexible polyvinyl chloride layer 11, a backing material 12, and a barrier layer 15 interposed between the polyvinyl chloride layer 11 and a thin outer top layer 14 formed from a dispersion of polyvinyl chloride in a solution of polymethyl methacrylate. The composition of the thin outer film 14 is described in U.S. Patent No. 2,439,051. It alone does not stop the aforesaid loss of plasticizer. In preparing it, polyvinyl chloride powder is dispersed in a solution of a hard, transparent polymerized unsaturated compound preferably polymethyl methacrylate in which organic solvents such as benzene or toluene are used. As described in the aforementioned U.S. Patent No. 2,439,051, suitable transparent polymerized unsaturated compounds are polymethacrylic esters of saturated aliphatic alcohols having one to three carbon atoms, as well as polymerized acrylic esters and polymethacrylonitrile.

Other suitable organic solvents for the above polymerized unsaturated compounds are xylene and trichloroethylene. Part of the solvent but preferably less than 50% can be methyl ethyl ketone, methyl isobutyl ketone, ethyl acetate or butyl acetate.

Plasticizer loss is minimized from polyvinyl chloride layer 11 by thin barrier layer 15 of polymethyl methacrylate. The resultant laminate is flexible, yet the laminate, including the polyvinyl chloride, remains flexible upon aging.

Surprisingly, a polymethyl-methacrylate coating can be applied to the face of the polyvinyl chloride film and yet the coating does not visibly craze when the laminate is flexed. The elimination of plasticizer loss in the vinyl chloride layer and crazing of polymethyl methacrylate layer is accomplished by the combination of barrier layer 15 and the thin flexible top coating 14 formed from polyvinyl chloride resin dispersions in solution of acrylic resins.

In accordance with present invention, the backing layer 12 may be from 10 to 50 mils thick and is generally about 15 to 20 mils. The polyvinyl chloride layer 11 is preferably about 10 to 15 mils in thickness although it may be as thin as 3 mils and as thick as 25 mils. A plasticized polyvinyl chloride composition, such as described earlier for floor mats in regard to layer 5 of the automobile floor mat, is also suitable for the layer 11 of the backed plastic sheeting.

The barrier layer 15 is about ¼ to ½ mil in thickness for best results, although a film as thin as .1 mil greatly decreases plasticizer migration. Barrier layers up to 1 mil or more may be used, although the flexibility of the laminate is greatly decreased when the layer is more than ½ mil.

The dry film thickness of the top coating 14 of polyvinyl chloride and polymethylmethacrylate is generally about .1 to 2 mils although a thickness in the range of .3 to 1 mil is preferred.

The following example illustrates the production of a flexible polyvinyl chloride backed sheeting without drawbacks of stickiness and loss of flexibility.

*Example II*

On a cotton duck backing there was calendered a layer 20 mils thick of a flexible plasticized polyvinyl chloride compound having the following composition:

| Ingredients | Parts by Weight |
| --- | --- |
| Polyvinylchloride | 100 |
| Di-ethyl hexylphthalate | 80 |
| Dyphos (dibasic lead phosphate) | 3 |
| Dythal (dibasic lead phthalate) | 0.5 |

The polyvinyl chloride sheet backed with cotton duck was top-coated by engraved roller with a polymethyl methacrylate solution of the following composition to form after drying a coating approximately ¼ mil thick on the polyvinyl chloride.

| Ingredients | Parts by Weight |
| --- | --- |
| Polymethyl methacrylate | 65 |
| Methyl ethyl ketone | 200 |
| Toluene | 385 |
| | 650 |

This barrier layer of the laminate was then coated with a solution prepared by mixing the following compositions I and II:

| | Ingredients | Parts by Weight |
| --- | --- | --- |
| I | Polyvinyl chloride resin (Geon 121) | 100 |
| | Paraplex G53 (a high molecular weight polyester plasticizer) | 20 |
| | Chlorowax 40 | 25 |
| | Paraplex G62 (an epoxidized medium molecular weight polyester plasticizer sold by Rohm and Hass) | 5 |
| | Diisobutylketone | 10 |
| | Stabilizer: Ferro No. 1212 barium-cadmium salts of fatty acids | 5 |
| | Solvesso 100 (an organic solvent sold by Esso Standard Oil Co.) | 50 |
| | | 215 |
| II | Lucite 41 (polymethyl methacrylate) | 65 |
| | Methyl ethyl ketone | 200 |
| | Toluene | 385 |
| | | 650 |

215 parts of composition I were mixed with 650 parts of composition II.

The dried top-coating was about 0.5 mil in thickness. The laminate is then heat embossed which fuses the barrier layer and top-coating together with the vinyl base sheet. The resulting product is flexible and does not suffer from crazing when flexed or the formation of many fine cracks or creases in the top surface of the laminate. The polyvinyl layer of the resulting laminate also does not become sticky or brittle from plasticizer loss since two thin layers applied over the polyvinyl chloride layer are impervious to plasticizers in the polyvinyl chloride film.

The resulting backed plastic sheeting is an excellent upholstery material for automobile interiors and convertible tops and can be used next to lacquer surfaces such as nitrocellulose-alkyd resin automobile finishes without softening or marring the lacquer by plasticizer migration.

The polyvinyl chloride composition of Example II may be substituted in whole or part by other plasticized resin compositions containing copolymers of vinyl chloride and vinyl acetate, copolymers of vinyl chloride and vinylidene chloride, as previously described as suitable for the polyvinyl chloride layer of the floor mat. Suitable plasticizers for polyvinyl chloride layer were also discussed previously.

The cotton fabric backing layer of Example II may be substituted by other fibrous backing materials such as rayon fabric, felt, paper, and a rayon fabric mixture with a high strength synthetic fiber such as nylon or Dacron.

Having described the invention, what I claim is:

1. A method of preparing a plasticized polyvinyl chloride rubber base laminate having a relatively thin layer of plasticized polyvinyl chloride composition and a relatively thick rubber base layer comprising the steps of coating a film of plasticized polyvinyl chloride composition with a solution of polymethyl-methacrylate dissolved in a suitable organic solvent, drying said solution to remove the solvent and form a solid barrier layer, and thereafter coating said barrier layer with an adhesive layer comprising a mixture of (1) a copolymer of diolefin and a copolymerizable nitrile of a beta unsaturated monocarboxylic acid having less than 6 carbon atoms with (2) a copolymer of a diolefin and a copolymerizable aryl vinyl compound, drying said mixture, assembling said coated polyvinyl chloride film on a rubber base with said adhesive in contact with said rubber base and subjecting said assembly to elevated temperature and pressure.

2. A method of forming a flexible polyvinyl chloride sheeting comprising the steps of depositing a layer of polymethyl-methacrylate on a plastic layer comprising a plasticized polymer of vinyl chloride, said plastic layer being supported by a fibrous backing material, and thereafter forming a top layer by depositing on said polymethyl-methacrylate layer a dispersion of polyvinyl chloride particles in a solution of polymethyl-methacrylate in a suitable organic solvent, and subsequently heating the entire assembly sufficiently to fuse the dispersed polyvinyl chloride resin particles and the polymethyl-methacrylate resin film together.

3. A flexible laminated plastic sheeting comprising a plasticized polyvinyl chloride base layer, a relatively thin layer of polymethyl-methacrylate adjacent said polyvinyl chloride layer and bonded thereto, a relatively thin layer adjacent said polymethyl-methacrylate from a dispersion of polyvinyl chloride resin in a solution of polymethyl-methacrylate in a suitable organic solvent.

4. A flexible laminated plastic sheeting comprising a layer of plasticized polyvinyl chloride secured to a layer of a fibrous backing material, a relatively thin protective layer of polymethylmethacrylate secured to the outer surface of said polyvinyl chloride layer and opposite to the layer of said backing material, and a relatively thin layer of a mixture of polymethyl-methacrylate and polyvinyl chloride secured to the surface of said layer of polymethylmethacrylate.

References Cited in the file of this patent
UNITED STATES PATENTS

| | | |
|---|---|---|
| 2,323,562 | Nugent | July 6, 1943 |
| 2,323,563 | Nugent | July 6, 1943 |
| 2,430,934 | Kemmler et al. | Nov. 18, 1947 |
| 2,431,078 | Powell et al. | Nov. 18, 1947 |
| 2,439,051 | McGill | Apr. 6, 1948 |
| 2,569,954 | Ruebensaal | Oct. 2, 1951 |
| 2,572,877 | Morris et al. | Oct. 30, 1951 |
| 2,626,886 | Scholl | Jan. 27, 1953 |
| 2,629,678 | Thompson et al. | Feb. 24, 1953 |
| 2,647,843 | Bemmels | Aug. 4, 1953 |
| 2,750,314 | Bemmels | June 12, 1956 |
| 2,893,908 | Antlfinger | July 7, 1959 |